(12) United States Patent
Gehlot

(10) Patent No.: US 6,462,850 B1
(45) Date of Patent: Oct. 8, 2002

(54) APPARATUS AND METHOD TO OVERCOME DISPERSION LIMITATIONS IN HIGH SPEED COMMUNICATIONS SYSTEMS AND NETWORKS

(75) Inventor: Narayan L. Gehlot, Sayerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/197,222

(22) Filed: Nov. 20, 1998

(51) Int. Cl.[7] .............................................. H04B 10/00
(52) U.S. Cl. ........................ 359/161; 359/173; 359/181
(58) Field of Search ................................. 359/161, 154, 359/173, 180, 181, 188, 189, 195

(56) References Cited

U.S. PATENT DOCUMENTS

| 5,339,183 A | * | 8/1994 | Suzuki | 359/123 |
|---|---|---|---|---|
| 5,373,382 A | * | 12/1994 | Pirio et al. | 359/161 |
| 5,522,004 A | * | 5/1996 | Djupsjobacka et al. | 359/173 X |
| 5,872,647 A | * | 2/1999 | Taga et al. | 359/181 X |
| 6,072,615 A | * | 6/2000 | Mamyshev | 359/181 X |
| 6,163,394 A | * | 12/2000 | Webb | 359/181 |
| 6,198,559 B1 | * | 3/2001 | Gehlot | 359/161 |

* cited by examiner

Primary Examiner—Thomas Mullen

(57) ABSTRACT

The present invention provides a transmission device and related system for use in high speed optical transmission systems. By changing the optical/electrical delay in one or more arms of a receiver, dispersion effects can be compensated for without using costly, high dispersion optical fiber and optical amplifiers or other like techniques to control dispersion.

24 Claims, 4 Drawing Sheets

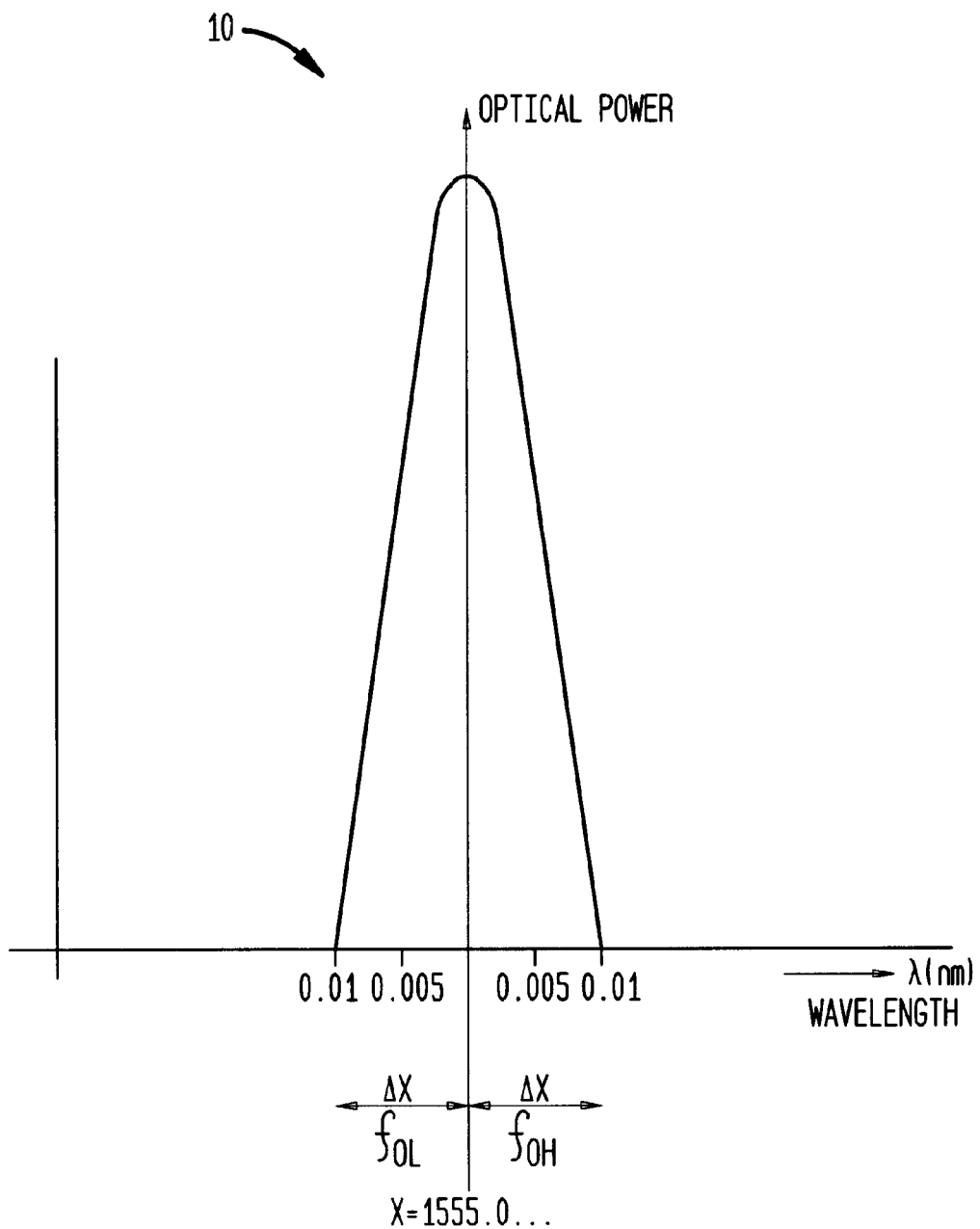

APPARATUS AND METHOD TO OVERCOME DISPERSION LIMITATIONS IN HIGH SPEED COMMUNICATIONS SYSTEMS AND NETWORKS

RELATED APPLICATIONS

This application is related to U.S. patent application Ser. No. 09/197,223 entitled SYSTEM AND METHOD FOR GENERATING NRZ SIGNALS FROM RZ SIGNALS IN COMMUNICATIONS NETWORKS (Gehlot-7), and U.S. patent application Ser. No. 09/197,071 now U.S. Pat. No. 6,198,559B1 entitled AUTOMATIC DELAY COMPENSATION FOR GENERATING NRZ SIGNALS FROM RZ SIGNALS IN COMMUNICATIONS NETWORKS (Gehlot-9), those applications having a common inventor and assignee with the instant application, and being incorporated herein by reference.

FIELD OF INVENTION

The present invention relates generally to the field of high speed optical communication and more particularly to high speed optical transmission systems utilizing dense wave division multiplexing (DWDM) and other like transmission schemes.

BACKGROUND OF INVENTION

In optical communications systems or optical networks utilizing dense wave division multiplexing (DWDM) and other optical transmission schemes, a laser diode is used to convert electrical signals to optical pulses for transmission over fiber optic cable. To a certain extent, most laser diodes have one or more of the following drawbacks when used for optical transmission, even without data modulation being applied: 1) Random optical amplitude fluctuations referred to as relative intensity noise (RIN) amplitude; 2) Random optical phase fluctuations; and 3) Random polarization fluctuations which result because of random polarization phase changes or individual random amplitude changes of polarization states or both.

In addition to the above drawbacks, when a laser diode is directly modulated, i.e., the laser diode current is changed in accordance with the digital data to be transmitted, the optical power output (RIN) and optical frequency change randomly, producing what is termed chirp. As is understood by those skilled in the art, chirp broadens the output spectrum of the laser diode. As a result of chirp, transmission distances are shortened and data rates are reduced. Furthermore, optical power limitations may be imposed to limit significant energy utilized as a result of the additional frequencies which are present because of chirp. As would be understood, chirp will depend on modulation waveform types, such as, square wave (maximum chirp), triangular wave, and sinusoidal wave (minimum chirp).

In addition to the above limitations which are present with the laser diode when used in connection with high speed optical communications, the fiber optic cable as used in the transmission introduces certain impairments into the data due to the non-linearities in the fiberoptic cable itself. As would be understood, the impairments may include dispersion, self phase modulation (SPM), cross phase modulation (XPM), FWM, etc.

The high speed optical communications which takes place within the optical systems and networks utilizing the laser diodes and fiberoptic cable may be transmitted using any one of a number of transmission coding schemes. Unipolar return-to-zero (URZ) and unipolar non-return-to-zero (UNRZ) schemes are commonly used in optical data transmission because of their unipolar characteristics. Since laser power is either zero or a certain positive quantity, only unipolar encoding can be implemented in fiber-optical communication systems. UNRZ is a widely used optical communication technique for laser modulation in optical communications because of its low bandwidth requirement as compared to URZ. URZ offers some advantages when used in fiberoptic systems with optical amplifiers; however, this use is at the cost of higher bandwidth.

High speed optical transmitters in the prior art have adopted one or the other coding scheme depending on a particular application and the amount of resources available, e.g., power, bandwidth, etc. The above discussed drawbacks and limitations associated with laser diodes and the corresponding optical networks are present, however, regardless of which of the coding schemes is utilized.

Accordingly, there is a need in the art for an optical transmitting device which combines advantages with respect to transmission of both the URZ and UNRZ coding schemes, while at the same time eliminating those limitations and impairments found in prior art laser diodes and optical networks.

SUMMARY OF THE INVENTION

The present invention is a transmitter device and related system and method for use in high speed optical transmission systems. In one exemplary embodiment of the present invention, light from a carrier source, e.g., a laser diode is output to a frequency discriminator which divides the light output into a higher order frequency component and a lower order frequency component. A first external optical modulator receives the lower order frequency components from the laser diode and modulates a first coded data, for example, URZ data from a URZ coder thereon. A second external optical modulator receives the higher order frequency components from the laser diode and modulates delayed first coded data, for example, delayed URZ data representative of the URZ data from the URZ coder thereon. The URZ data and the delayed URZ data may be combined at the transmitter, at any part of the optical cable or at a receiver. The delay at the receiver in the delayed URZ data is preferably T/2, where T is a pulse period of URZ data. The higher order (URZ) and lower order (URZ) frequencies are uniquely added together at one of the above locations in order to realize a second coded data type, for example, UNRZ data. With dispersive optical fiber cable between the transmitter and receiver the higher order and lower order frequency signals encounter propagation delays and arrive at the receiver separately. By changing the optical delay in one or the other or both arms of the receiver, the dispersion effect is compensated without using costly high dispersion fiber, expensive optical amplifiers or other like methods to control dispersion. An advantage of the present invention is that the overall bandwidth of the transmitted data is the same as UNRZ. Transmission of the URZ along with delayed URZ pulses enable one to take advantage of the benefits that these transmission techniques offer for optical networks with optical amplifiers.

BRIEF DESCRIPTION OF THE DRAWINGS

For a better understanding of the present invention, reference may be had to the following description of exemplary embodiments thereof, considered in conjunction with the accompanying drawings, in which:

FIG. 1 shows an exemplary linewidth of a light output from a narrow linewidth laser diode;

DETAILED DESCRIPTION

The present invention is an apparatus and method for use as, or with, a high speed optical transmitter, and which reduces the optical power penalty incurred due to dispersion and other limiting factors associated with laser diodes and their corresponding optical networks. In order to achieve such an improvement in optical power penalty, the present invention takes advantage of a unique hybrid coding scheme which enables two occurrences of identical URZ data to be transmitted (one occurrence being delayed by a given amount) where the two transmissions are later combined to produce UNRZ data. As is explained more fully in co-pending U.S. patent application Ser. No. 09/197,223 entitled "SYSTEM AND METHOD FOR GENERATING NRZ SIGNALS FROM RZ SIGNALS IN COMMUNICATIONS NETWORKS" (Gehlot-7), which is incorporated herein by reference, this hybrid coding scheme has significant advantages over the prior art in that it is an efficient way to receive UNRZ data by transmitting URZ coded data. This is significant in that URZ coded data has properties that favor optical transmission and it is therefore desirable to be able to transmit URZ data instead of UNRZ data and still be able to realize the benefits of receiving UNRZ data.

Figure 2A:
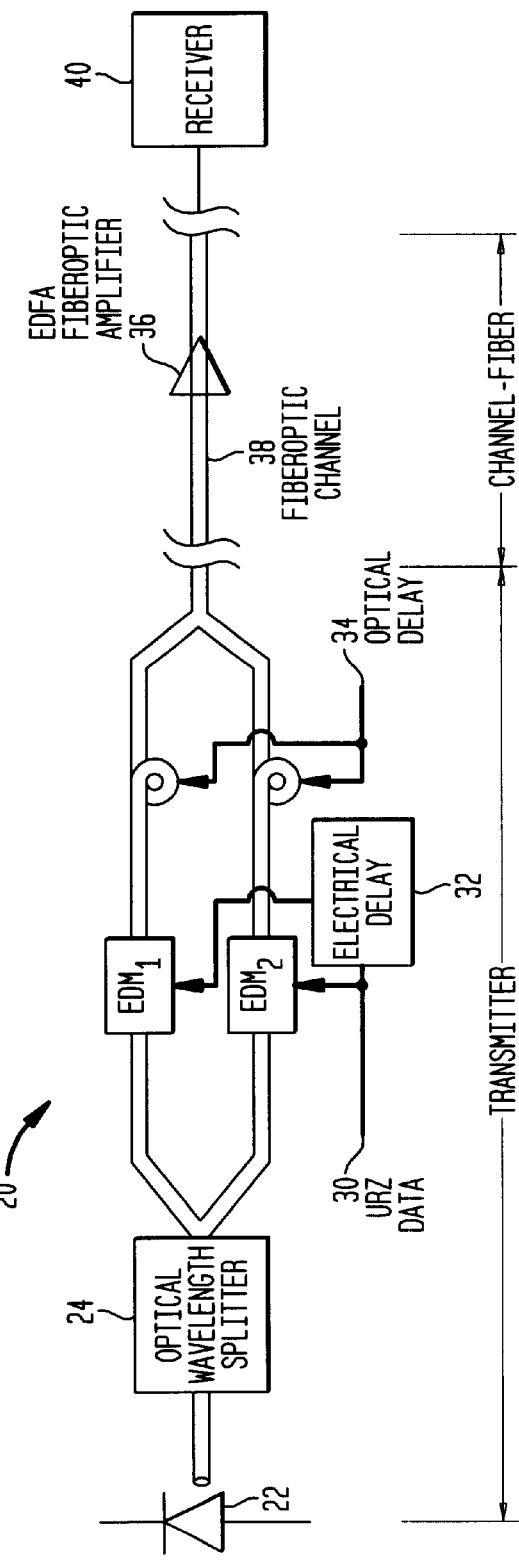
FIGS. 2A, 2B and 2C show three exemplary embodiments of an optical transmitter in accordance with the present invention.
Figure 2B:
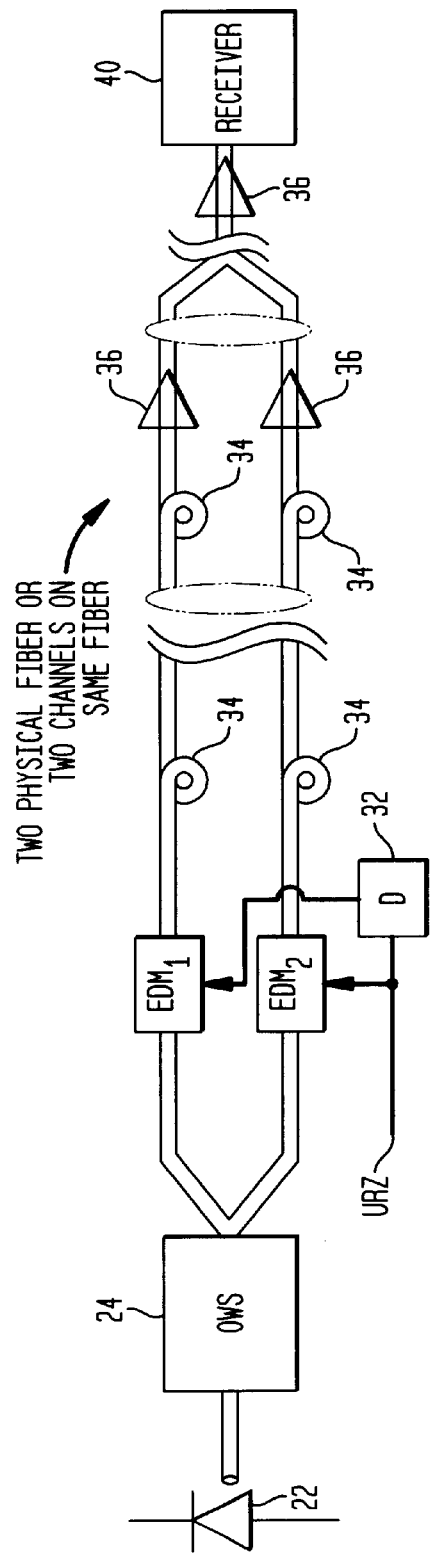
Figure 2C:
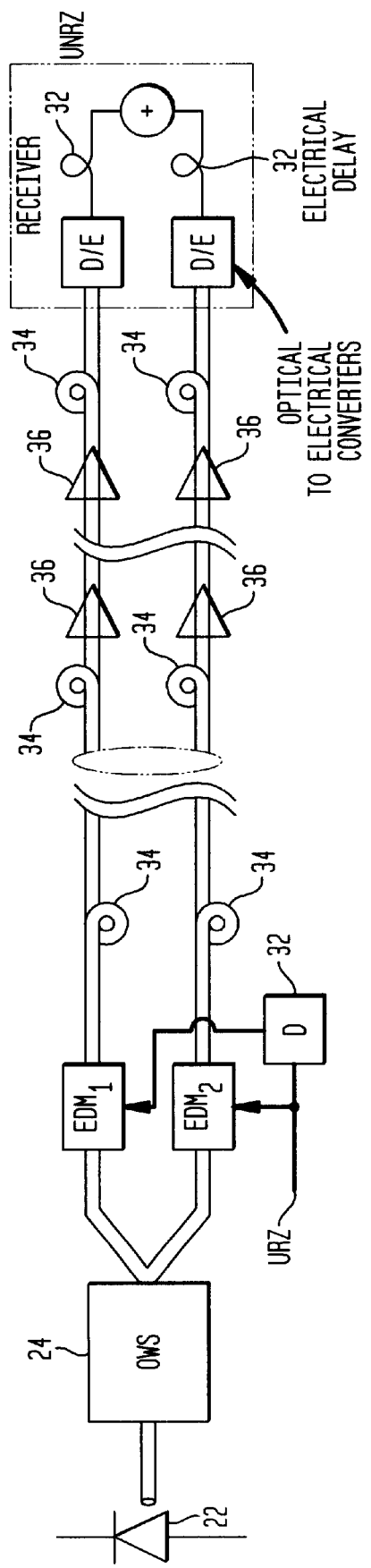

Referring to FIG. 1, an exemplary light output 10 from a laser diode is shown at a given optical wavelength/optical frequency X. As can be seen, a number of higher order frequencies $f_{OH}$ and lower order frequencies $f_{OL}$ are also present. In other words, the optical light from a coherent source has a finite linewidth. This finite linewidth has optical frequencies that are lower than the nominal center frequency X, termed $f_{OL}$, (where $f_{OL}=X-\Delta X$) and also has frequencies that are higher than the nominal center frequency X, termed $f_{OH}$, (where $f_{OH}=X+\Delta X$). Referring to FIG. 2A, 2B and 2C in connection with FIG. 1, exemplary embodiments of an optical transmitter 20 are shown in accordance with the present invention. The transmitter 20 includes at least a laser diode 22. As shown, the light produced from the laser diode may be split into two components using an optical frequency discriminator.

For example, let the nominal linewidth of a coherent laser diode 22 be 0.01 nm measured at full-width half-maxima (FWHM). Assume the operating wavelength to be about 1555.0 nm. When this laser light is passed through an optical frequency discriminator 24, for example, a Bragg grating or other similar device, the optical lower frequencies (1555.0 nm−0.005 nm=$f_{OL}$) and the optical higher frequencies (1555.0 nm+0.005 nm=$f_{OH}$) are obtained. $F_{OL}$ is then passed through a first external optical modulator 26 and $f_{OH}$ is passed through a second external optical modulator 28. As shown, the first optical modulator is modulated with URZ data from URZ coder 30 which receives data from a data source (not shown). The second external optical modulator 28 is modulated with the identical URZ data which has been delayed in signal delay element 32 by a given amount to obtain $URZ_d$. The delay in the exemplary embodiment at the receiver is T/2, where T is the period of a URZ pulse, however, it would be understood that other delays are also permissible. The signals are next combined at the transmitter 20 (FIG. 2A) which connects to fiber optic channel 38 and to receiver 40, or along the fiber medium, where there may be two physical fibers or two channels 34 on the same fiber (FIG. 2B), or at the receiver (FIG. 2C). At least one optical delay 34 is used in each leg of the transmitter, between the transmitter and receiver or at the receiver alone (as explained in detail more fully in co-pending U.S. patent application Ser. No. 09/197,223 (Gehlot-7)), in order that the signals may combine properly to produce UNRZ data at the receiver. As would be understood, the optical delay is a function of the path propagation, wavelength and fiber type. At this point the phase between the two sets of URZ data may be adjusted automatically as is disclosed in detail by related co-pending application Ser. No. 09/197,071 (Gehlot 9), entitled AUTOMATIC DELAY COMPENSATION FOR GENERATING NRZ SIGNALS FROM RZ SIGNALS IN COMMUNICATIONS NETWORKS, the disclosure of which is incorporated herein by reference. As shown in FIGS. 2A, 2B and 2C, the optical transmission systems shown may also include optical amplifiers 36 at various locations throughout.

Figure 3:
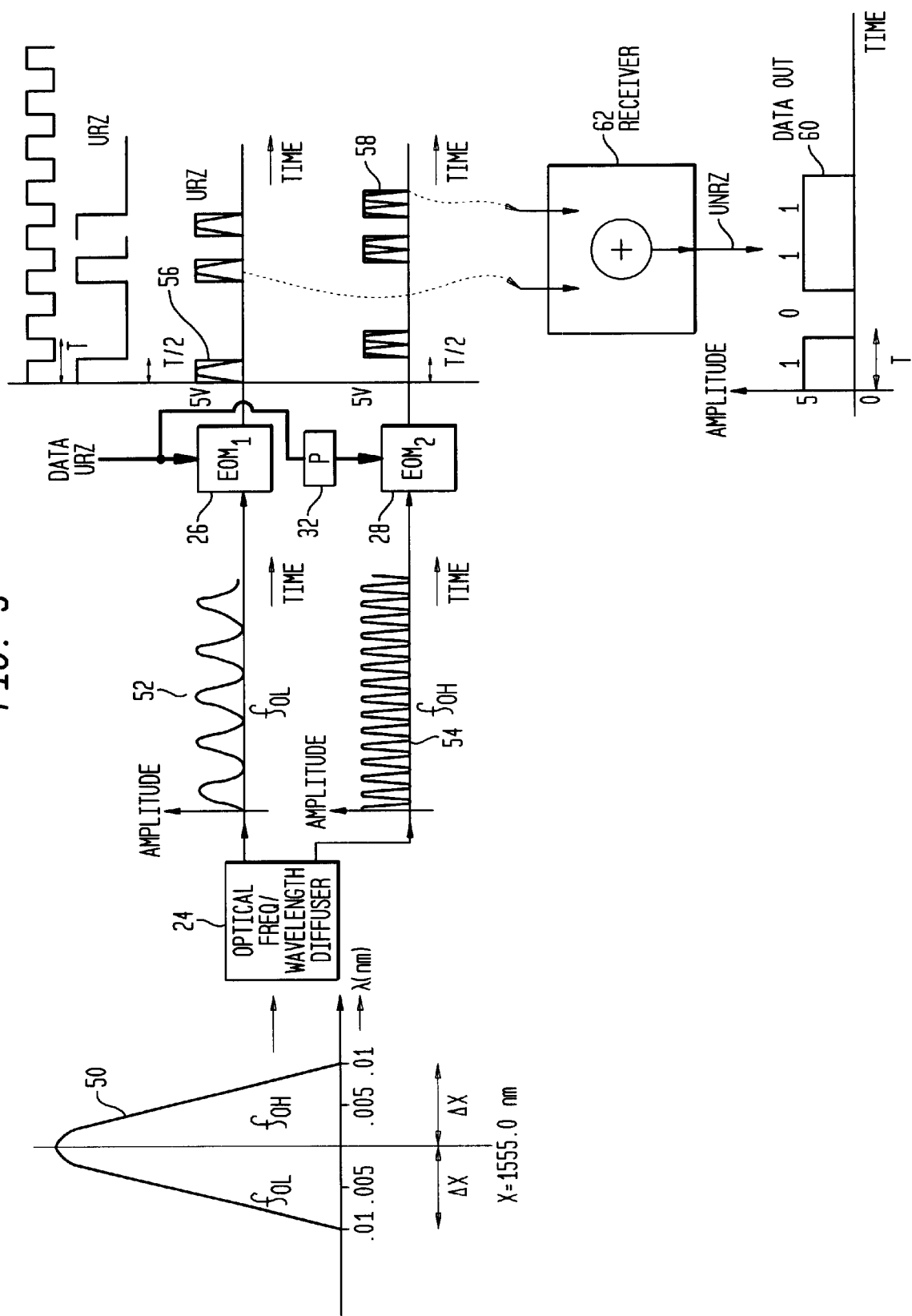
FIG. 3 shows an exemplary graphical representation of signals produced by a transmitter at various stages of processing.

FIG. 3 shows a graphical representation of the signals produced by transmitter 20 at the various stages of processing. As shown, signal 50 is representative of the signal produced by the laser diode 22 prior to it entering the frequency discriminator 24. Signal 52 and signal 54 are representative of $f_{OL}$ and $f_{OH}$, respectively, as produced by the frequency discriminator 24. The URZ and $URZ_d$ data from the data source are then modulated utilizing the first and second external optical modulators 26, 28. This produces, the URZ data signals as shown by signal 56 and signal 58. (Although the exemplary embodiment of the invention as shown in FIGS. 2 and 3 shows the $f_{OH}$ component of the laser diode signal being delayed by T/2 from the $f_{OL}$ component, it would be understood by those skilled in the art that the $f_{OL}$ component could be delayed from the $f_{OH}$ component as well.) FIG. 3 also illustrates that signal 56 representing the $f_{OL}$ component and signal 58 representing the $f_{OH}$ component from the transmitter 20 may be summed at receiver 62 to produce signal 60 which is representative of a UNRZ data signal.

In the absence of any optical fiber cable between the transmitter 20 and receiver 62 (referred to as a back to back connection of transmitter and receiver) UNRZ data is recovered by adding the two URZ signals 56, 58 externally or within the optical field. With dispersive optical fiber cable between the transmitter and receiver the $f_{OL}$ and $f_{OH}$ signals 56, 58 each encounter propagation delays and arrive at the receiver separately. By changing the optical (or electrical) delay in one or the other or both of either two channels on separate fibers or on the same fiber of the receiver 62, the dispersion effect can be compensated without using costly high dispersion fiber with optical amplifiers or other like methods to control dispersion. As mentioned previously, it would be understood that the optical delay is a function of path propagation, wavelength and fiber type, where the optical delay can be adjusted for example by altering the length of the fiber optic cable or other similar methods using high (±) dispersion passive/active optics.

In general, the present invention is advantageous in that the optical power penalty incurred because of dispersion, and other inherent limitations present in most laser diodes, are significantly reduced. The data rate is always the same for all the formats, only the data coding is different, such as when URZ or UNRZ coding is used.

The present invention is unique in that a coherent optical source is being split into two closely spaced optical sources $f_{OL}$ and $f_{OH}$. The $f_{OL}$ frequency is modulated with URZ data and the $f_{OH}$ optical frequency is modulated with $URZ_d$ data at the transmitter (or vice versa) to eventually obtain UNRZ data at the receiver. Thus, different coding is being used at the optical modulator of the transmitter relative to the optical receiver. The present invention is also unique in that a digital data clock or digital data clock harmonics (low or high) are not being used to modulate the optical frequency, optical phase or optical polarization. In addition, the present invention does not use optical frequency modulation by a data rate which is one half of the data rate at the receiver as has been done in the prior art. The present invention also does not modulate the optical frequency of the laser diode prior to data modulation.

The present invention thus provides a unique methodology to enable the receipt of UNRZ data through the transmission of only URZ data, where the URZ coded data has properties that favor optical transmission mediums and optical amplifiers relative to UNRZ data. A simple and efficient method is also presented for controlling dispersion. As explained, the present invention also eliminates the need for expensive dispersion control fiber, while at the same time eliminating the need for bulk optics in order to provide dispersion compensation. In addition, the need for variable dispersion compensation per channel in DWDM is eliminated. Further, manual tracking which is usually needed for dispersion compensation is no longer needed in that it can be automated as explained in related copending application Ser. No. 09/197,071 entitled AUTOMATIC DELAY COMPENSATION FOR GENERATING NRZ SIGNALS FROM RZ SIGNALS IN COMMUNICATIONS NETWORKS (Gehlot 9), the disclosure of which has herein been incorporated by reference.

From the above, it should be understood that the embodiments described, in regard to the drawings, are merely exemplary and that a person skilled in the art may make variations and modifications to the shown embodiments without departing from the spirit and scope of the invention. For example, the present invention transmitter, transmitter receiver system and related coding scheme although described with respect to an optical communications system may also be utilized in wireless, modem, cable television and data networks or any other communication system or chip-to-chip communication within a chip or on circuit boards. In addition, application of the methodology of the invention has been described hereafter in terms of a preferred embodiment based on URZ and UNRZ coding of data to be transmitted in an optical communications system. It will, however, be apparent to those skilled in the art that the inventive methodology may be applied for a variety of other coding or modulation techniques applied in electrical and optical communication systems. All such variations and modifications are intended to be included within the scope of the invention as defined in the appended claims.

I claim:

1. A transmitter device for transmitting data on a carrier source, said device comprising
    a first modulator for receiving lower order frequency components from said carrier source and modulating first coded data from a coder coupled thereto on said low order frequency components;
    a second modulator for receiving higher order frequency components from said carrier source and modulating delayed first coded data representative of said first coded data from said coder on said higher order frequency components; and
    at least one output port coupled to said first and second modulator for transmission of said first coded data and said delayed first coded data over a transmission medium.

2. The device of claim 1, further including a frequency discriminator coupled prior to said first and second modulator.

3. The device of claim 1, wherein said carrier source is single mode source.

4. The device of claim 3, wherein said single mode source is a laser diode and said transmission medium is an optical transmission medium.

5. The device of claim 4, wherein the length of said medium is adjustable to compensate for dispersion effects.

6. The device of claim 1, wherein said coder is a URZ coder for producing said first coded data and said delayed first coded data.

7. The device of claim 1, wherein said first coded data and said delayed first coded data are combinable into a second coded data type.

8. The device of claim 7, further including a receiver coupled to said transmission medium, and wherein said first coded data and said delayed first coded data are combined at a location selected from the group consisting of the transmitter device, transmission medium, and said receiver.

9. The device of claim 8, wherein a net delay for said delayed first coded data at said location to combine said data is T/2, where T is a period of a said first coded data pulse.

10. The device of claim 8, wherein said delay for said first coded data is produced by elements selected from the group consisting of electrical delay elements, optical delay elements and a combination of electrical and optical delay elements.

11. The device of claim 7, wherein said first coded data and said delayed first coded data is URZ data and said second coded data type is UNRZ data.

12. The device of claim 1, wherein said first and second modulator are external optical modulators (EOMs).

13. A system including a transmitter device for transmitting data on a carrier source, and a receiver for receiving said data, said system comprising
    a transmitter including,
        a first modulator for receiving lower order frequency components from said carrier source and modulating first coded data from a coder coupled thereto on said low order frequency components;
        a second modulator for receiving higher order frequency components from said carrier source and modulating delayed first coded data representative of said first coded data from said coder on said higher order frequency components;
        at least one output port coupled to said first and second modulator for transmission of said first coded data and said delayed first coded data over a transmission medium; and
    a receiver including,
        at least one input for receiving said first coded data and said delayed first coded data, said receiver including a decoder for decoding and translating said first coded data and said delayed first coded data received from said transmitter into a second coded data type.

14. The system of claim 13 further including a combiner for combining said first coded data and said delayed first coded data for transmission over said medium.

15. The system of claim 13, wherein a net delay of said delayed first coded data at said receiver is T/2, where T is a period of a first coded data pulse.

16. The system of claim 13, wherein said carrier source is a laser diode and said transmission medium is an optical transmission medium.

17. The system of claim 13, wherein said first coded data and said delayed first coded data are combined at a location selected from the group consisting of the transmitter device, transmission medium, and said.

18. The system of claim 13, wherein said first coded data and said delayed first coded data is URZ data and said second coded data type is UNRZ data.

19. The system of claim 13, wherein said delay for said first coded data is produced by elements selected from the group consisting of electrical delay elements, optical delay elements and a combination of electrical and optical delay elements.

20. A method of transmitting data, said method comprising the steps of receiving lower order frequency components from a carrier source at a first modulator and modulating first coded data on said low order frequency components from a URZ coder coupled thereto;

receiving higher order frequency components from said carrier source at a second modulator and modulating delayed first coded data representative of said first coded data from said coder on said higher order frequency components; and transmitting said first coded data and said delayed first coded data wherein a combination of said first coded data and said delayed first coded data is decodable into a second coded data type.

21. The method of claim 20, further including the step of receiving said first coded data and said delayed first coded data, and dacoding and translating said first coded data and said delayaed first coded into a second coded data type.

22. The method of claim 20, wherein a medium for transmission is a fiber optic cable and the length of said medium is adjustable to compensate for dispersion effects.

23. The method of claim 20, wherein a net optimum end-to-end delay of said delayed first coded data is T/2, where T is a period of a first coded data pulse.

24. The method of claim 20, wherein said first coded data is URZ data and said second coded data type is UNRZ data.

* * * * *